United States Patent
Pólik et al.

(10) Patent No.: US 10,209,097 B2
(45) Date of Patent: Feb. 19, 2019

(54) INDUCTIVE DISPLACEMENT MEASURING SENSOR AND METHOD FOR OPERATING THE LATTER

(71) Applicant: Balluff GmbH, Neuhausen a. d. F (DE)

(72) Inventors: Zoltán Pólik, Gyoer (HU); Zoltán Kántor, Nemesvámos (HU)

(73) Assignee: Balluff GmbH, Neuhausen a. d. F. (DE)

( * ) Notice: Subject to any disclaimer, the term of this patent is extended or adjusted under 35 U.S.C. 154(b) by 252 days.

(21) Appl. No.: 14/778,219

(22) PCT Filed: Mar. 19, 2013

(86) PCT No.: PCT/DE2013/000155
§ 371 (c)(1),
(2) Date: Sep. 18, 2015

(87) PCT Pub. No.: WO2014/146623
PCT Pub. Date: Sep. 25, 2014

(65) Prior Publication Data
US 2016/0076912 A1    Mar. 17, 2016

(51) Int. Cl.
*G01D 5/20*       (2006.01)
*G06N 3/04*       (2006.01)

(52) U.S. Cl.
CPC .............. *G01D 5/20* (2013.01); *G01D 5/2053* (2013.01); *G06N 3/04* (2013.01)

(58) Field of Classification Search
CPC ........... G01D 5/20; G01D 5/2053; G06N 3/04
USPC .................................................. 702/66, 170
See application file for complete search history.

(56) References Cited

U.S. PATENT DOCUMENTS

| | | | | |
|---|---|---|---|---|
| 5,345,539 A | * | 9/1994 | Webb | ...................... G01S 7/417 342/350 |
| 5,742,741 A | * | 4/1998 | Chiueh | .................. G06N 3/063 706/27 |
| 5,835,613 A | * | 11/1998 | Breed | ...................... B60J 10/00 348/143 |
| 5,898,304 A | | 4/1999 | Mandl | |
| 6,819,790 B2 | * | 11/2004 | Suzuki | .................. G06T 7/0012 382/130 |

(Continued)

FOREIGN PATENT DOCUMENTS

CN           743839 A      3/2006
CN         2809640 Y      8/2006

(Continued)

OTHER PUBLICATIONS

"Ultrasonic Distance Sensor Improvement Using a Two-Level Neural Network" A Carullo et al. IEEE 1995.*

(Continued)

*Primary Examiner* — Tan T. Nguyen
(74) *Attorney, Agent, or Firm* — Collard & Roe, P.C.

(57) ABSTRACT

In an inductive displacement measuring sensor for measuring the distance, the spatial orientation, the thickness, the material properties or the like of a target object, which sensor has a transmitter element which emits a pulsed signal and a receiver element for detecting a pulse response caused by the emitted pulsed signal in the target object, provision is made, in particular, for the detected pulse response to be immediately evaluated using an artificial neural network.

10 Claims, 6 Drawing Sheets

(56) References Cited

U.S. PATENT DOCUMENTS

| | | | |
|---|---|---|---|
| 8,125,219 B2 | 2/2012 | Jungbluth et al. | |
| 9,599,576 B1* | 3/2017 | Portune | G01N 22/02 |
| 2002/0043560 A1* | 4/2002 | Woods | G07D 7/185 |
| | | | 235/438 |
| 2002/0059022 A1 | 5/2002 | Breed et al. | |
| 2002/0082756 A1 | 6/2002 | Breed et al. | |
| 2008/0144944 A1* | 6/2008 | Breed | G06K 9/00369 |
| | | | 382/224 |
| 2008/0285856 A1* | 11/2008 | Zahavi | G06K 9/50 |
| | | | 382/195 |
| 2010/0179934 A1* | 7/2010 | Howley | G01J 3/28 |
| | | | 706/12 |
| 2010/0312733 A1* | 12/2010 | Song | G01R 31/3651 |
| | | | 706/25 |

FOREIGN PATENT DOCUMENTS

| | | |
|---|---|---|
| CN | 101587097 A | 11/2009 |
| CN | 101706882 A | 5/2010 |
| CN | 102050366 A | 5/2011 |
| CN | 102269972 | 12/2011 |
| CN | 102402835 A | 4/2012 |
| DE | 42 01 502 A1 | 7/1993 |
| DE | 101 17 218 A1 | 10/2002 |
| EP | 0 692 773 A2 | 1/1996 |
| EP | 2 124 044 A1 | 11/2009 |

OTHER PUBLICATIONS

"A Photon-Counting Time-of-Flight Ranging Technique Developed for the Avoidance of Range Ambiguity at Gigahertz Clock Rate" Hiskett et al., Aug. 2008 Optic Express Sep. 1, 2008/ vol. 16, No. 18.*

International Search Report of PCT/DE2013/000155, dated Dec. 20, 2013.

Chinese Office Action in CN 201380075585.7, dated Sep. 5, 2016.

Li et al, "Gas Quantitative Detector Based on MSP430 and Artificial Neural Network", Instrument Technique and Sensor, 2006 (2), pp. 19-20.

German Office Action in DE 11 2013 006 849.4, dated Jun. 20, 2018.

* cited by examiner

INDUCTIVE DISPLACEMENT MEASURING SENSOR AND METHOD FOR OPERATING THE LATTER

CROSS REFERENCE TO RELATED APPLICATIONS

This application is the National Stage of PCT/DE2013/000155 filed on Mar. 19, 2013, the disclosure of which is incorporated by reference. The international application under PCT article 21(2) was not published in English.

The invention concerns an inductive displacement measuring sensor and a method for operating the latter.

PRIOR ART

Inductive displacement measuring systems which work in a contactless manner are known in the field of measurement technology. Therefore, a corresponding sensor arrangement having an artificial neural network (ANN) emerges from U.S. Pat. No. 5,898,304 A1, in which a measuring coil and an evaluation unit are provided, by means of which the detection, the processing and evaluation of measured signals occurs.

The ANN described therein comprises an input layer, at least one (hidden) intermediate layer, an output layer as well as weightings provided at the connection points between two individual layers. Suitable values for the respective weighting factors are determined in a learning phase in which test measurements are carried out on a number of different target objects of known materials as well as at a known distance from the sensor. The sensor arrangement should be suitable to determine both distances and thicknesses independently of the material of the respective target object.

In the displacement measuring system referred to, the inductivity data measured by the measuring coil undergoes a spectral analysis by means of the artificial neural network (ANN). The basis for this is the dependency of the measured spectrum on the spatial distance to the target object. During the spectral analysis, numerical calculations in particular are implemented on the measured temporally different variables of electrical voltage and current which means considerable calculation effort and inhibits a compact construction method as well as cost-effective implementation of the sensor.

DISCLOSURE OF THE INVENTION

The object of the invention is to specify an inductive displacement measuring sensor of the type referred to at the beginning which dispels the disadvantages of the prior art referred to.

The invention is based on the recognition that a spectral analysis referred to is not required for a displacement measuring system or a corresponding displacement measuring sensor concerned here, as the calculated frequency spectra do not contain additional information compared to the measured, temporally varying signals from which they are calculated. Additionally, no spectral or temporal features which are useful for the distance measurement can be found with an ANN-based evaluation of the frequency spectra according to the present investigation results.

Contrary to this, the invention proposes to evaluate the temporally varying signal detected by the measuring coil directly by means of an ANN, i.e. without intermediate spectral analysis. Preferably, a pulse response caused by a non-periodic (transient) signal transmitted by the transmitter coil from the target object to be measured is thus evaluated by the ANN. The pulse response is generated substantially by eddy currents induced in the target object and magnetic polarisation. The ANN supplies distance data of the target object as an output signal.

The displacement measuring sensor according to the invention has a characteristic line which is independent of the ambient temperature or operating temperature of the sensor as well as the respective material of the target object to be measured. In this characteristic line, result data (e.g. distance data) supplied by the displacement measuring sensor, are applied versus the actual distance determined in another way. The characteristic line resulting for the displacement measuring sensor according to the invention is preferably formed to be linear, or represents at least a strictly monotonously running curve. In the ideal case of a linear course, the gradient of the characteristic line corresponds substantially to the value 1.

Due to the direct evaluation of the inductively detected measurement signal by means of an ANN, i.e. without the requirement of an intermediate spectral analysis, considerably reduced hardware expenditure for the sensor results, whereby a substantially more compact construction is enabled compared to prior art. For example, it is thereby enabled to integrate the ANN and the additionally required logic into a microcontroller, whereby the production costs can also be clearly reduced.

The inductive displacement measuring sensor according to the invention is suitable for determining the distance, the spatial orientation, the thickness and the material properties of a metallic target object to be measured, having the advantages described herein.

It must be noted that the ANN can be configured or programmed according to the purpose of use of the sensor in such a way that instead of the material-independent measurement referred to, a material-specific measurement is enabled.

It must furthermore be emphasised that the displacement measuring sensor can be used only preferably for displacement measuring systems which work inductively and fundamentally is also able to be used with the advantages described herein for displacement measuring sensors which work non-inductively, in which a corresponding pulse response is evaluated. Examples of displacement measuring sensors which work non-inductively are sensors which work optically, aurally (ultrasound) or in an electrically capacitive manner.

DETAILED DESCRIPTION OF THE EXEMPLARY EMBODIMENTS

Figure 1:
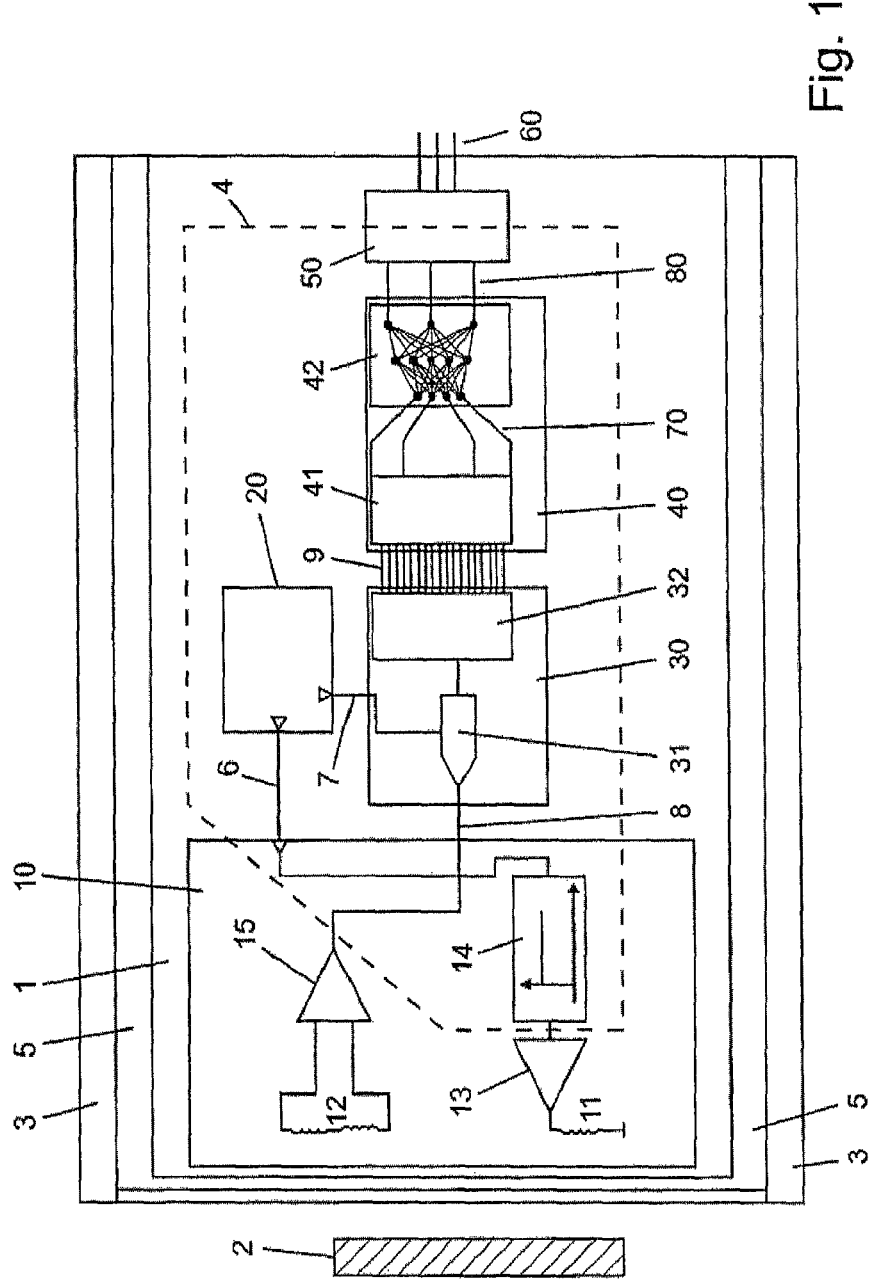
FIG. 1 shows an exemplary embodiment of a displacement measuring sensor according to the invention, using the example of a distance sensor, by means of a block diagram.

The inductive distance sensor 1 shown in FIG. 1 comprises an (analogue) sensor or measuring transducer 10, a timing unit 20, a digitalisation unit 30 to digitalise the detected signal, a signal evaluation unit 40 as well as an output unit 50. In the exemplary embodiment, the functional components referred to are arranged in a single housing 5. The timing unit 20, the digitalisation unit 30 as well as the signal evaluation unit 40 are in particular implemented in a microcontroller 4. The distance sensor 1 additionally comprises a voltage supply which is not shown here.

The measuring transducer 10 comprises at least one transmitter coil 11, at least one receiver coil 12, an operational amplifier 13 for the transmitter coil 11, a triggered waveform generator 14 as well as an operational amplifier 15 which is connected to the receiver coil 12 and processes the respectively applied signal. The transmitter coil 11 and the receiver coil 12 represent the primary sensor elements of the distance sensor 1.

The digitalisation unit 30 comprises an A/D converter 31 and a memory 32 to store waveforms. The signal evaluation unit 40 comprises a downsampler 41 for the reduction of the number of samples as well as an artificial neural network (ANN) 42. This arrangement enables the direct evaluation of a time-dependent (transient) pulse response of a target object 2 which is downsampled with respect to the sampling rate, by means of the ANN 42.

Figure 2:
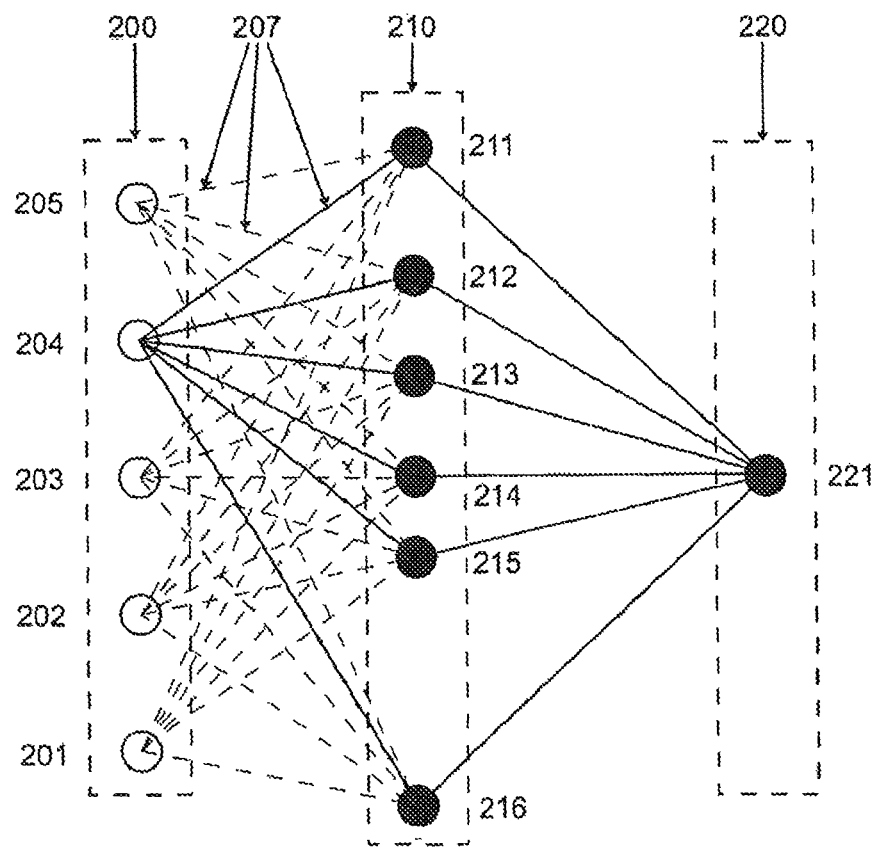
FIG. 2 shows an exemplary embodiment of an artificial neural network (ANN)

FIG. 2 shows the structure of an ANN. In FIG. 2, connection lines arranged between neurons of an input layer 200 and hidden layer 210 are marked with a dashed line for depiction purposes only.

The ANN comprises an input layer 200, at least one non-visible or hidden layer 210, as well as an output layer 220. Each input node or each input neuron 201-205 of the input layer 200 is physically (electrically, optically, etc.) or logically connected to each hidden neuron 211-216 arranged in the hidden layer 210 via predetermined weighting factors 207. Each hidden neuron 211-216 arranged in the hidden layer 210 is connected to each output neuron 221 arranged in the output layer 220 via predetermined weighting factors 207.

Should the ANN have more than one hidden layer 210, then all input neurons 201-205 are connected to each neuron arranged in the first hidden layer 210 via predetermined weighting factors, wherein each neuron of a previous hidden layer is connected to each neuron of the subsequent hidden layer via predetermined weighting factors and wherein all neurons of the last hidden layer are connected to each output neuron of the output layer 220.

Each neuron executes a summation of the values provided by the respective previous layer and applied with predetermined weighting factor in an intrinsically known matter and evaluates the resulting sum by means of a neural function. The result of this evaluation represents the output value of the respective neuron. Intrinsically known functions such as, for example, the linear function, the sigma function, the hyperbolic tangent ("tangens hyperbolicus") or the sign function are considered as a neural function.

The sole output neuron 221 arranged in the output layer 220 in the present exemplary embodiment provides the output values of the entire ANN 42. The input layer 200 and the output layer 220 are connected to the surroundings of the ANN 42, in the present exemplary embodiment to the downsampler 41 and the output unit 50, whereas the hidden layers 210 referred to are not accessible directly from the outside.

In the present investigations, it has astonishingly resulted that the ANN 42, when using only a few neurons in the input layer 200, and indeed in the present exemplary embodiment 5 neurons, as well as only 6 neurons arranged in the hidden layer 210, already supplies distance data which is independent of the material of the target object with a maximum error of only 2.65% as well as an average error of 0.79%. This corresponds approximately to the accuracy which is obtained for an ANN topology with 24 input nodes or neurons and 20 hidden neurons.

A comparison of the calculation effort resulting for each of these two topologies results in the following: the larger of the two topologies requires 24*20+20=500 multiplications, 500 summations as well as an evaluation of 25 functions. Contrary to this, the reduced or simplified topology requires only 6*5+6=36 multiplications, 36 summations as well as an evaluation of 7 functions. According to this, the requirements for the hardware resources for the reduced topology are considerably reduced compared to the larger topology. The reduced topology can therefore be implemented in a current microcontroller 4 which supplies the results of the calculation referred to in a relatively short time. Therefore, for a microcontroller 36 operating with 24 MHz and a 32 bit wide data path, less than 200 μs calculation time is required for 36 multiplications for 7 functions.

The described distance sensor 1 is suitable to determine the distance, the spatial orientation, the thickness and/or the material properties of a metallic target object 2 to be measured, which is arranged in spatial proximity to the primary sensor element 11, 12 referred to, and supplies a corresponding signal or result data to the sensor output 60.

As is furthermore evident from FIG. 1, the transmitter coil 11 is stimulated by a non-periodic (transient) current signal which is supplied by a waveform generator 14, wherein the stimulation signal is amplified by the operational amplifier 13. The waveform generator 14 is triggered by a trigger signal 6 supplied by the timing unit 20. The transmitter coil 11 generates a temporally varying (i.e. transient) magnetic field in the surroundings of the sensor 1. Due to the temporally varying behaviour as well as the inhomogeneity of this magnetic field, a voltage is induced in the at least one receiver coil 12. In the event of a metallic target object 2 being positioned in proximity to the primary sensor element, the changing magnetic field of the transmitter coil 11 generates eddy currents in the target object 2 and causes a magnetic polarisation there. Additionally, the target object 2 is magnetically polarised, which in turn reacts to the magnetic field generated by the transmitter coil 11 and modifies this, whereby the time course of the voltage induced in the receiver coil 12 also changes accordingly. The voltage induced in the receiver coil 12 is amplified by means of the signal-processing operational amplifier 15 and results in a measurement signal 8.

In parallel to the emission of the trigger signal 6, the AD converter 31 carries out a periodic conversion of the measurement signal 8, which is triggered by the timer signal emitted by the timing unit 20 and resulting from the A/D conversion. The thus present digitalised values of the converted signal are each stored in a waveform memory 32, and indeed until a predetermined number of samples have been converted. The waveform memory 32 stores each of the present, complete sets of digitalised values as a digitalised waveform 9 of the converted signal. Optionally, the waveform 9 is downsampled by means of the downsampler 41 and supplied to the ANN 42 as input data 70. The ANN 42 generates output data 80 from the input data 70. Sensor output data 60 is generated from the output data 80 by means of an output unit 50.

It must be noted that the input data 70 can also be detected on the basis of unequal sampling intervals, alternatively to the described data detection on the basis of equal sampling intervals as well as a subsequent downsampling.

Figure 3:
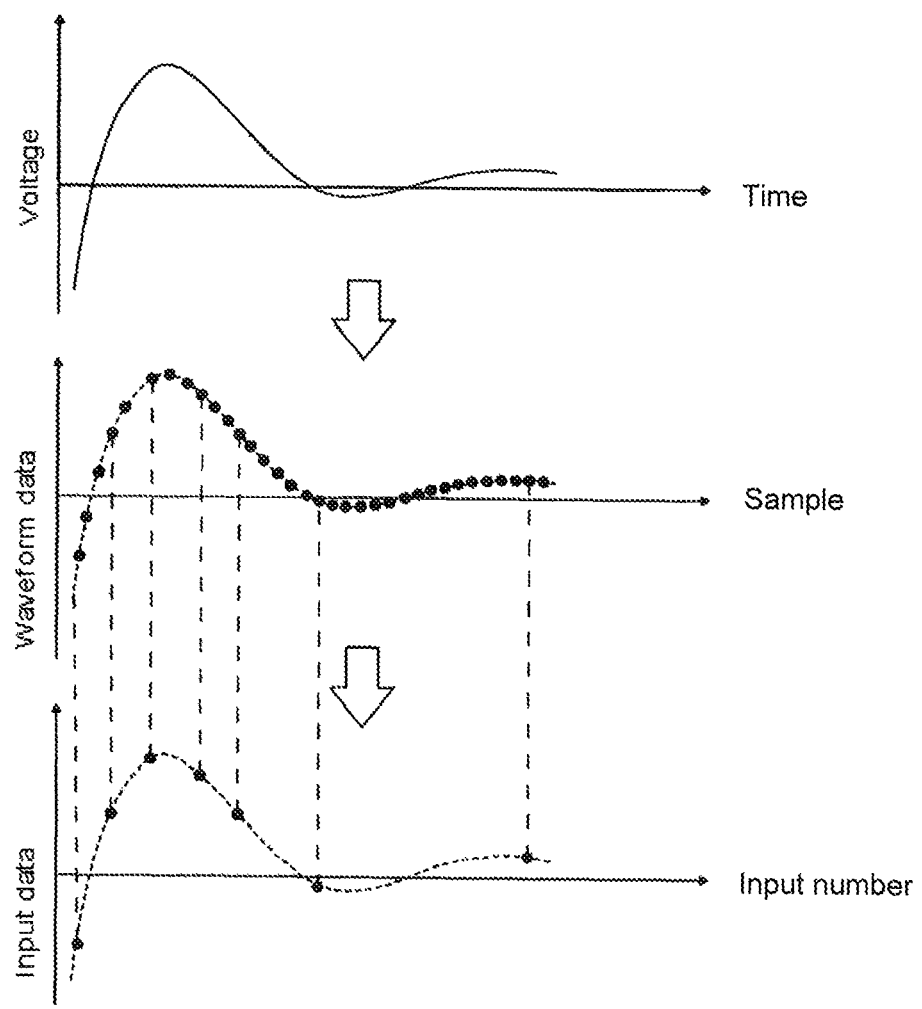
FIG. 3 illustrates the typical temporal connection between a measurement signal, a digitalised waveform and input data.

The temporal connection between the measurement signal 8, the digitalised waveform 9 and the input data 70 is evident from FIG. 3. It is known that temperature changes cause characteristic changes of the waveform and therefore also corresponding changes of the measured waveform. During training of the ANN 42, temperature-dependent waveforms are therefore used as input data as well as corresponding target object distances. With this data, the ANN 42 supplies temperature-independent output data under normal operating conditions.

It is furthermore known that the temperature-dependent waveform, in particular with medium-sized or larger target object distances, can be considered as an additive component of the digitalised waveform 9. Therefore, in the event of known temperature dependency of the sensor system, training data for various temperatures and different target object materials, target object distances, etc., can be generated by way of an extrapolation of actually measured data, even if this data is detected under the temperature conditions during the production of the sensors.

The measurement signal 8 is not only the result of the currents induced in the target object 2 and the magnetic polarisation taking place there, but also of structural features of the distance sensor 1 as well as of the surroundings 3 of the sensor 1. Therefore, the metal influences the measurement results in the case of a sensor having a metal housing 5. Therefore, the temporal course of the measurement signal 8 is overall influenced or determined both by the electrical conductivity and the magnetic permeability of the target object, the structural features of the sensor 1 and the surroundings 3 thereof, as well as its size, shape, position and orientation. Therefore, the input data 70 is sufficient in any case in order to generate the results or output data referred to.

The downsampling referred to therefore occurs in order to generate a subset of the digitalised waveform 9 which is as small as possible and which is sufficient to be able to calculate the result data or result signals present at the output 60 of the sensor 1 with predetermined accuracy. The downsampling therefore causes an advantageous reduction of the hardware resources necessary for the implementation of the ANN 42, and indeed by reduction of the memory requirements and number of the input neurons 201-205 and the neurons arranged in the hidden layer 210.

The present investigations on the time-dependent response or reaction of metallic target objects to a pulsed stimulation show that the majority of usable information relates to the first 15-20 is after the beginning of a stimulation pulse. Therefore, it is advantageous to sample the measurement signal in odd numbers or with low sampling rates after quick transient detection or recording has already occurred.

The input data 70 can also be composed data which is formed from a subset of the digitalised converted waveform 9 as well as the digitalised values of measured distorting parameters, for example temperature.

Therefore, a distortion-independent sensor operation is ensured. Physical variables such as the target object distance and physical distortion variables such as the temperature, present external magnetic fields, etc. influence the measurement signal 8 in certain ways. Therefore, information present at the input of the ANN 42 concerning these physical variables can be used to decouple the measurement signal from the distortion effects referred to.

The output unit 50 converts the output data 80 into sensor output data. Considered numerically, each piece of output data of the sensor 1 is the result of a simple mathematical calculation or an evaluation of a predetermined threshold value using logic operations, wherein the respective output signal present at the output 60 is, in the light of physics, generated by a voltage or current source and wherein a signal present at the output 60 can additionally be amplified by means of a power amplifier. The sensor output signal is furthermore a data format or a typical signal type which is typical for industrial distance sensors and proximity switches. The sensor output signal can, for example, provide an output current of 4-20 mA or an output voltage of 0-10 V, wherein these currents or voltages vary linearly with the target object distance in the sensitivity range of the sensor.

The ANN 42 has at least one output layer 220, via which the data corresponding to the measured distance or similar of the target object 2 is emitted. After an appropriate teaching in or training phase, the ANN is capable of supplying correct output data 80 concerning the measured input data 70. During the training procedure, the weightings of the ANN 42 referred to are iteratively adapted in an intrinsically known way to available input data 70 as well as to the output data 8 to be expected. The weighting values resulting therein are filed in the system memory of the microcontroller 4.

Figure 4:
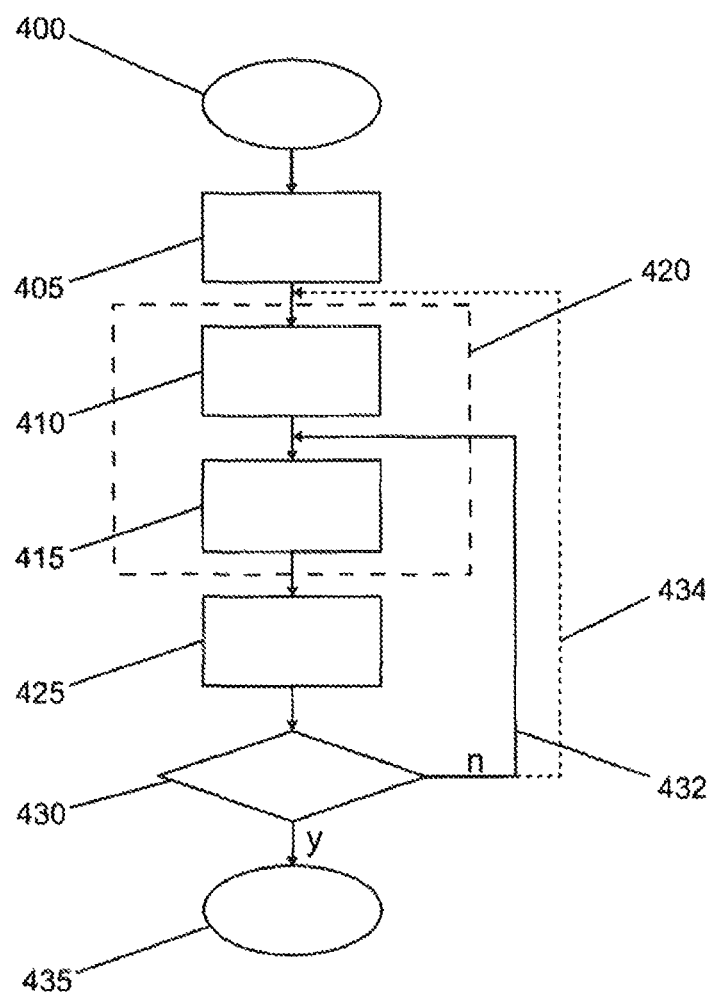
FIG. 4 shows an exemplary embodiment of the method according to the invention to teach in or train a distance sensor shown in FIG. 1.

As is evident in FIG. 4, the ANN-based signal evaluation unit 41 executes the following work steps for the purposes of training. After the start 400 of the shown routine, the declaration of the structure and of the dimensions of the ANN 42 occurs in step 405. The following steps 410 and 415 represent the actual training phase 420. In step 410, the detection of data sets occurs in order to generate a knowledge-based database from this, by means of which the ANN 42 is to be trained. In step 415, the implementation of training occurs using a suitable training method, based on the data sets referred to. A suitable training method is, for example, the intrinsically known Levenberg-Marquardt algorithm in which the weighting factors are varied both between the input layer and the allocated neurons and also between the neurons and the allocated output layer until correct output data (i.e. distance values or similar) result for each input vector (i.e. measurement signal). As the values of such input vectors are dependent on the material of the target object, the ANN 42 can learn to calculate the correct distance or similar for any material.

In step 425, a test of the sensor functions then occurs with the correspondingly trained ANN 42. If required, after testing of the accuracy (step 430) of the resulting sensor data, a repetition of the steps referred to (caused return 432 to step 415) occurs. Due to the repetition, the structure and the topology of the ANN 42 can be optimised in order to thereby achieve the required accuracy. Additionally, an optional return path 434, marked with a dashed line, is provided which is, for example, then taken if the required accuracy is not achieved multiple times and therefore the conclusion can be made that the training data itself is erroneous or insufficient. If the accuracy resulting from the testing 430 is sufficient, the routine is ended with step 435.

The actual training of the ANN 42 begins with the composition of a training data set, and indeed in the form of a field (array) of input data sets 70 for the ANN 42 determined for the training. These input data sets 70 comprise downsampled, digitalised signal waveforms for the transducer 10 as well as a temperature-related variable. The temperature-related variable can be measured in an intrinsically known way by means of a heat-dependent resistor (thermistor).

The training data referred to comprises a plurality of target object distances, target object materials, target object shapes and target object alignments or orientations of the target object as well as data measured for different temperatures. As has already been explained, the training data, as a rule, is generated under fixed temperature conditions which prevail during the production of the sensors such that the corresponding signal waveforms for different temperatures must be obtained by extrapolation. An empirically obtained temperature behaviour can be the basis for the extrapolation. Additionally, said numerical data which relates to the measurement conditions such as, for example, material properties, geometry and distance of the target object 2 as well as, optionally, the material properties and the geometry of the surroundings 3 is considered. These measurements are executed repeatedly, yet avoiding overtraining the ANN 42. The learning ability of the ANN 42 can be increased by a certain noise being present for the data provided for the training.

After the training has been carried out, the characteristic line of the sensor referred to is preferably represented as a linear or at least strictly monotonously variable curve as a function of the target object distance, which enables a highly effective and relatively simple evaluation of the result data. Additionally, the characteristic line is independent of the surrounding or operational temperature and the respective material of the target object.

In the present exemplary embodiment, the output signal of the sensor represents an analogue voltage signal which is typical in distance sensors used in the industry and has already been mentioned above. Alternatively, the output signal can also be formed by an analogue current or a digital signal.

It must be noted that the functionality of the sensor 1 can be pre-set in a highly variable manner by means of training such that very different applications are possible. Therefore, the sensor can be trained in such a way that it supplies an output signal which is specific to the respective material of the target object and/or that ferromagnetic and non-ferromagnetic material of the target object can be differentiated between. Also, the sensor 1 can be trained as a metal detector or coin sorter, or as a sensor for measuring the thickness of the target object or similar.

It must be noted that the described distance measurement by means of the sensor 1 according to the invention is only preferred and the sensor can also be implemented with the function of a position sensor or proximity switch. In the case of a proximity switch, this also works in a temperature-independent and material-independent manner. The sensor can, however, also be trained in such a way that it works either in a material-independent or material-selective manner, wherein it is either detected in a material-dependent manner, or, however, the detection can be refused depending on the material.

Figure 5:
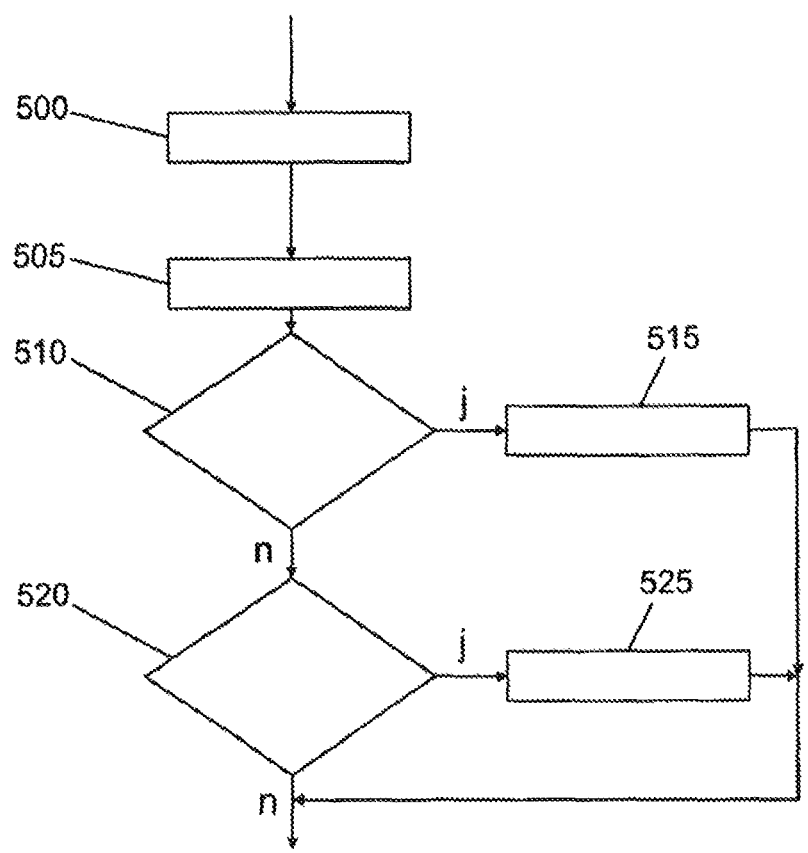
FIG. 5 shows an exemplary embodiment of the method according to the invention for operating a distance sensor shown in FIG. 1, using the example of a proximity switch.

As is evident in FIG. 5, in the case of a proximity switch, the input data 70 of the ANN 42 can either be evaluated by a numerical hysteresis comparator or by coding a step function as an evaluation function in at least two neurones of the output layer 220. The topology shown in FIG. 2 must be adapted for this purpose and the only one output neuron 221 must be replaced by at least two output neurons. An example of a suitable topology having three output neurons is the ANN 42 shown in FIG. 1. In this case, the ANN 42 is trained in such a way that one of the outputs of the ANN 42 is switched to if the measured distance between the sensor and the target object reaches or exceeds an upper threshold value on a predetermined hysteresis curve, and that another output is switched to if the measured distance between the sensor and the target object reaches or falls below a lower threshold value on the hysteresis curve. The sensor outputs 60 are thus updated respectively by means of the output data 80 of the output unit 50.

According to step 500, in FIG. 5, the downsampler 41 firstly provides input data to the ANN 42. In step 505, the evaluation takes place by means of the hysteresis comparator or the step function or threshold referred to. In step 510 it is tested whether the value of the measured distance supplied by the ANN 42 exceeds the upper threshold referred to. If this condition is fulfilled, in step 515, the sensor output is switched into the "ON" state. If the condition, however, is not fulfilled, according to step 520 it is tested whether the value of the measured distance supplied by the ANN 42 falls below the lower threshold referred to. If this condition is fulfilled, the sensor output is switched into the "OFF" stated in step 525. If neither of the two conditions referred to above is fulfilled, the sensor output is not changed or switched.

Alternatively, the evaluation of a hysteresis curve referred to can occur by means of reduced ANN topology, in which only one single binary output neuron which is traced back to the input layer (i.e. connected to the input layer) is provided.

A correspondingly trained ANN 42 has been tested by means of four target objects each made of a different material. In FIG. 3, the results are depicted in the form of a characteristic line referred to, in which distance data supplied by the ANN 42 is applied to reference data which is measured in a separate way. Here, distance data obtained at 2, 3, 4 and 5 mm is evaluated. The different materials of the target object are copper (Cu), aluminium (Al), V2A steel (V2A) and EC80 construction steel or heat-treatable steel with the steel code EC80 (EC80). The ANN 42 has been "fed" with the corresponding sensor data at the input layer 200 thereof and the output data resulting at the output 220 of the ANN 42 is recorded.

Figure 6:
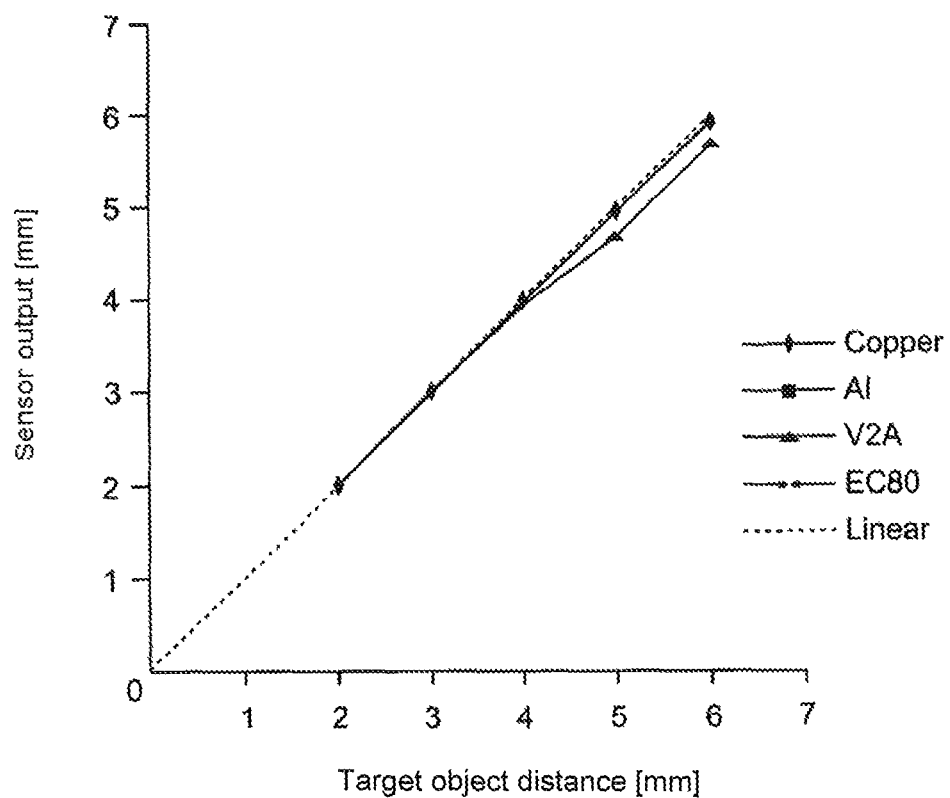
FIG. 6 shows a characteristic line diagram to compare distance data calculated with an ANN with reference data measured in another way.

The data shown in FIG. 6 illustrates the high excellence or quality of the results of the ANN 42, i.e. the resulting distance data lies very close to or on a linear curve (dashed) which is likewise shown in FIG. 6. Therefore, the distance values calculated by the ANN are correct and in particular independent of the material of the target object, as all curves (with the single exception of V2A) lie very exactly one above the other. In particular, during these investigations it resulted that the ANN 42 already supplies sufficiently precise data during the use of only a few network nodes or neurons (e.g. 5 as in FIG. 2) as well as a correspondingly reduced data set to be evaluated, and the ANN 42 can therefore be arranged or integrated into a usual microcontroller 4, in particular using generally available components and therefore in a cost-efficient manner.

LIST OF REFERENCE NUMERALS

1 Sensor
2 Target object ("target")
3 Surroundings

4 Switch region of the microcontroller
5 Housing
6 Trigger signal
7 Timer for A/D converter
8 Encoder signal
9 Digitalised waveform
10 measuring transducers
11 Transmitter coil(s)
12 Receiver coil(s)
13 Coil-driven operational amplifier
14 Waveform generator
15 Signal-processing operational amplifier
20 Timing unit
30 Signal digitalisation unit
31 A/D converter
32 Waveform memory
40 Signal evaluation unit
41 Downsampler
42 Artificial neural network (ANN)
50 Output unit
60 Sensor outputs
70 Input data
80 Output data

The invention claimed is:

1. Inductive displacement measuring sensor for measuring distance, spatial orientation, thickness, or material properties of a target object, the sensor comprising:
   a waveform generator configured to emit a non-periodic, current signal,
   a transmitter element configured to emit a non-periodic, pulsed signal and configured to be stimulated by the non-periodic, current signal emitted by the waveform generator,
   a receiver element for detecting a pulse response in the target object caused by the emitted non-periodic, pulsed signal,
   a timing unit configured to supply trigger signals,
   a signal digitalization unit configured to:
      digitize the detected pulse response such that a digitized waveform is formed and
      supply the digitized waveform to a microcontroller, and
   the microcontroller, the microcontroller comprising a signal evaluation unit, the signal evaluation unit comprising an artificial neural network, the artificial neural network being configured to evaluate the digitized waveform without intermediate spectral analysis,
   wherein the waveform generator and the signal digitization unit are triggered by the trigger signals supplied by the timing unit.

2. Displacement measuring sensor according to claim 1, wherein the signal evaluation unit further comprises a downsampler to reduce the number of samples.

3. Displacement measuring sensor according to claim 2, wherein the downsampler is configured to generate input data for the artificial neural network with unequal sampling intervals.

4. Displacement measuring sensor according to claim 1, wherein the artificial neural network comprises a hidden layer and fewer than ten nodes and fewer than twelve neurons arranged in the hidden layer.

5. Displacement measuring sensor according to claim 4, wherein the artificial neural network has five nodes and six neurons arranged in the hidden layer.

6. Displacement measuring sensor according to claim 1, wherein the artificial neural network supplies results which are independent of the material of the target object as well as of the ambient temperature and/or the temperature of the displacement measuring sensor.

7. Displacement measuring sensor according to claim 1, wherein the artificial neural network supplies results which are dependent on the material of the target object.

8. Displacement measuring sensor according to claim 1, wherein the output of the sensor is formed by a linear function of the target object distance.

9. Method for operating a displacement measuring sensor, the method comprising steps of:
   emitting a non-periodic, current signal via a waveform generator of the sensor,
   stimulating a transmitter element of the sensor via the non-periodic, current signal such that the transmitter signal emits a non-periodic, pulsed signal,
   detecting a pulse response in a target object via a receiver element of the sensor, the pulse response being caused by the emitted non-periodic pulsed signal,
   digitizing via a signal digitalization unit the detected pulse response such that a digitized waveform is formed,
   supplying the digitized waveform to an artificial neural network of a signal evaluation unit of a microcontroller of the sensor,
   evaluating the digitized waveform without intermediate spectral analysis and via the artificial neural network, and
      if a result supplied by the artificial neural network exceeds an upper threshold value, switching an output of the sensor into a first state or
      if a result supplied by the artificial neural network falls below a lower threshold value, switching the output of the sensor into a second state,
   wherein the waveform generator and the signal digitization unit are triggered by trigger signals supplied by a timing unit.

10. Method according to claim 9, wherein the evaluation of the input data occurs via a hysteresis comparator or a step function in the artificial neural network.

* * * * *